US012699042B2

(12) United States Patent
Giryes et al.

(10) Patent No.: US 12,699,042 B2
(45) Date of Patent: Aug. 4, 2026

(54) SYSTEM AND METHOD FOR POLARIZATION IMAGING

(71) Applicant: Ramot at Tel-Aviv University Ltd., Tel-Aviv (IL)

(72) Inventors: Raja Giryes, Tel-Aviv (IL); Shay Avraham Elmalem, Tel-Aviv (IL)

(73) Assignee: Ramot at Tel-Aviv University Ltd., Tel-Aviv (IL)

( * ) Notice: Subject to any disclaimer, the term of this patent is extended or adjusted under 35 U.S.C. 154(b) by 391 days.

(21) Appl. No.: 18/198,354

(22) Filed: May 17, 2023

(65) Prior Publication Data

US 2023/0375462 A1 Nov. 23, 2023

Related U.S. Application Data

(60) Provisional application No. 63/342,751, filed on May 17, 2022.

(51) Int. Cl.
| | |
|---|---|
| *G01N 21/21* | (2006.01) |
| *G02B 5/02* | (2006.01) |
| *G02B 27/28* | (2006.01) |
| *H04N 25/40* | (2023.01) |

(52) U.S. Cl.
CPC ........... *G01N 21/21* (2013.01); *G02B 5/0263* (2013.01); *G02B 27/288* (2013.01); *H04N 25/40* (2023.01)

(58) Field of Classification Search
CPC ....... G02B 5/0263; G02B 27/288; G01J 4/04; H04N 25/40
See application file for complete search history.

(56) References Cited

U.S. PATENT DOCUMENTS

| | | | |
|---|---|---|---|
| 8,654,246 B2 | 2/2014 | Kanamori | |
| 9,293,491 B2 | 3/2016 | Kanamori et al. | |
| 2012/0307128 A1* | 12/2012 | Vorovitchik | G01J 3/447 |
| | | | 348/336 |

OTHER PUBLICATIONS

Antipa et al. "DiffuserCam: Lensless Single-Exposure 3D Imaging", Optica, 5(1): 1-9, Dec. 22, 2017.
Antipa et al. "Video From Stills: Lensless Imaging With Rolling Shutter",2019 IEEE International Conference on Computational Photography, ICCP, Tokyo, Japan, May 15-17, 2019, ArXiv Preprint ArXiv, 1905.13221v1, p. 1-8, May 30, 2019.
Asif et al. "Flatcam: Thin, Lensless Cameras Using Coded Aperture and Computation", IEEE Transactions on Computational Imaging, 3(3): 384-397, Sep. 2017.
Ba et al. "Deep Shape From Polarization", Computer Vision—ECCV 2020, ECCV 2020: 16th European Conference, Glasgow, UK, Aug. 23-28, 2020, Proceedings, Part XXIV, LNCS, 12369: 554-571, Aug. 23, 2020.

(Continued)

*Primary Examiner* — Paisley L Wilson

(57) ABSTRACT

A system for polarization imaging comprises an optical diffuser characterized by a point spread function (PSF), an image sensor, a spatially multiplexed polarization filter between the optical diffuser and the image sensor, and an image processor. The image processor receives signals from the image sensor and reconstructs, based on the PSF, a separate image for each polarization direction formed on the polarization filter.

19 Claims, 4 Drawing Sheets
(3 of 4 Drawing Sheet(s) Filed in Color)

(56)            References Cited

OTHER PUBLICATIONS

Beck et al. "A Fast Iterative Shrinkage-Thresholding Algorithm With Application to Wavelet-Based Image Deblurring", 2009 IEEE International Conference on Acoustics, Speech and Signal Processing, Taipei, Taiwan, Apr. 19-24, 2009, p. 693-696, Apr. 19, 2009.

Blau et al. "The Perception-Distortion Tradeoff", 2018 IEEE/CVF Conference on Computer Vision and Pattern Recognition, CVPR, Salt Lake City, UT, USA, Jun. 18-23, 2018, p. 6228-6237, Jun. 18, 2018.

Boominathan et al. "PhlatCam: Designed Phase-Mask Based Thin Lensless Camera", IEEE Transactions on Pattern Analysis and Machine Intelligence, 42(7): 1618-1629, Published Online Apr. 23, 2020.

Boyd et al. "Distributed Optimization and Statistical Learning Via the Alternating Direction Method of Multipliers", Foundations and Trends in Machine Learning, 3(1): 1-122, Jan. 1, 2011.

Deschaintre et al. "Deep Polarization Imaging for 3D Shape and SVBRDF Acquisition", Proceedings of the 2021 IEEE/CVF Conference on Computer Vision and Pattern Recognition, CVPR, Nashville, TN, USA, Jun. 20-25, 2021, p. 15567-15576, 2021.

Elad "Sparse and Redundant Representations: From Theory to Applications in Signal and Image Processing. Image Priors and the Sparseland Model", Textbook, Springer Publishing Company, 103 P., 2010.

Fade et al. "Long-Range Polarimetric Imaging Through Fog", Applied Optics, 53(18): 3854-3865, Published Online May 9, 2014.

Kim et al. "Lensless Photography With Only An Image Sensor", Applied Optics, 56(23): 6450-6456, Aug. 10, 2017.

Lefaudeux et al. "Compact and Robust Linear Stokes Polarization Camera", Polarization: Measurement, Analysis, and Remote Sensing VIII, Proceedings, SPIE Defense and Security Symposium, Orlando, Florida, USA, 2008, 6972: 76087-1-76087-12, Apr. 1, 2008.

Li et al. "Learning-Based Denoising for Polarimetric Images", Optics Express, 28(11): 16309-16321, May 25, 2020.

Monakhova et al. "Spectral DiffuserCam: Lensless Snapshot Hyperspectral Imaging With A Spectral Filter Array", Optica, 7(10): 1298-1307, Sep. 29, 2020.

Monakhova et al. "Untrained Networks for Compressive Lensless Photography", Optics Express, 29(13): 20913-20929, Jun. 21, 2021.

Morimatsu et al. "Monochrome and Color Polarization Demosaicking Using Edge-Aware Residual Interpolation", 2020 IEEE International Conference on Image Processing, ICIP, Abu Dhabi, United Arab Emirates, Oct. 25-28, 2020, p. 2571-2575, Oct. 25, 2020.

Ongie et al. "Deep Learning Techniques for Inverse Problems in Imaging", IEEE Journal on Selected Areas in Information Theory, 1(1): 39-56, May 1, 2020.

Perrin "Polarization of Light Scattered by Isotropic Opalescent Media", The Journal of Chemical Physics, 10(7): 415-427, Jul. 1942.

Porat et al. "Widefield Lensless Imaging Through A Fiber Bundle Via Speckle Correlations", Optics Express, 24(15): 16835-16855, Jul. 25, 2016.

Qiu et al. "Effective Snapshot Compressive-Spectral Imaging Via Deep Denoising and Total Variation Priors", Proceedings of the 2021 IEEE/CVF Conference on Computer Vision and Pattern Recognition, CVPR 2021, Nashville, TN, USA, Jun. 20-25, 2021, p. 9127-9136, Jun. 20, 2021.

Qiu et al. "Polarization Demosaicking for Monochrome and Color Polarization Focal Plane Arrays", International Symposium on Vision, Modeling, and Visualization, 8 P., 2019.

Ramella-Roman et al. "A Review of Polarization-Based Imaging Technologies for Clinical and Preclinical Applications", Journal of Optics, 22(12): 123001-1-123001-18, Nov. 11, 2020.

Rodriguez et al. "Polarimetric Data-Based Model for Tissue Recognition", Biomedical Optics Express, 12(8): 4852-4872, Jul. 15, 2021.

Romano et al. "The Little Engine That Could: Regularization by Denoising (Red)", SIAM Journal on Imaging Sciences, 10(4): 1804-1844, Published Online Oct. 19, 2017.

Rubin et al. "Matrix Fourier Optics Enables A Compact Full-Stokes Polarization Camera", Science, 365(6448): eaax1839-1-eaax1839-10, Jul. 5, 2019.

Rudin et al. "Nonlinear Total Variation Based Noise Removal Algorithms", Physica D: Nonlinear Phenomena, 60(1-4): 259-268, Nov. 1, 1992.

Schmid et al. "ZIMPOL/CHEOPS: A Polarimetric Imager for the Direct Detection of Extra-Solar Planets", Astronomical Polarimetry: Current Status and Future Directions, ASP Conference Series, Proceedings of the Conference, Waikoloa, Hawaii, USA, Mar. 15-19, 2004, 343: 89-91, Mar. 15, 2004.

Shribak "Polychromatic Polarization Microscope: Bringing Colors to A Colorless World", Scientific Reports, 5: 17340-1-17340-10, Nov. 27, 2015.

Sinha et al. "Lensless Computational Imaging Through Deep Learning", Optica, 4(9): 1117-1125, Sep. 15, 2017.

Solomon "Polarization Imaging", Applied Optics, 20(9): 1537-1544, May 1981.

Sony "Polarization Image Sensor. Image Sensor for Industrial Use", Sony Semiconductor Solutions Group, 10 P., Dec. 24, 2021.

Tang "A Restoration of Underwater Polarized Images Based on DCP", 2019 International Conference on Sensing, Diagnostics, Prognostics, and Control, SDPC, Beijing, China, Aug. 15-17, 2019, p. 675-678, Aug. 15, 2019.

Tirer et al. "Image Restoration by Iterative Denoising and Backward Projections", IEEE Transactions on Image Processing, 28(3): 1220-1234, Published Online Oct. 11, 2018.

Tyo et al. "Polarization in Remote Sensing-Introduction", Applied Optics, 45(22): 5451-5452, Aug. 1, 2006.

Ulyanov et al. "Deep Image Prior", Proceedings of the IEEE Conference on Computer Vision and Pattern Recognition, CVPR 2018, Salt Lake City, UT, USA, Jun. 18-22, 2018, p. 9446-9454, Jun. 18, 2018.

Venkatakrishnan et al. "Plug-and-Play Priors for Model Based Reconstruction", 2013 IEEE Global Conference on Signal and Information Processing, Austin, TX, USA, Dec. 3-5, 2013, p. 945-948, Dec. 3, 2013.

Weiss et al. "Two-Photon Lensless Micro-Endoscopy With In-Situ Wavefront Correction", Optics Express, 26(22): 28808-28817, Oct. 29, 2018.

Yanny et al. "Miniscope3D: Optimized Single-Shot Miniature 3D Fluorescence Microscopy", Light, Science & Applications, 9: 171-1-171-13, Oct. 2, 2020.

Yuan et al. "Plug-and-Play Algorithms for Video Snapshot Compressive Imaging", IEEE Transactions on Pattern Analysis and Machine Intelligence, 44(10): 7093-7111, Published Online Sep. 14, 2022.

Zhang et al. "Learning A Convolutional Demosaicing Network for Microgrid Polarimeter Imagery", Optics Letters, 43(18): 4534-4537, Sep. 15, 2018.

Zhang et al. "Learning Deep CNN Denoiser Prior for Image Restoration", 2017 IEEE Conference on Computer Vision and Pattern Recognition, CVPR, Honolulu, Hawaii, USA, Jul. 21-26, 2017, p. 3929-3938, Jul. 21, 2017.

Zhang et al. "PCA-Based Denoising Method for Division of Focal Plane Polarimeters", Optics Express, 25(3): 2391-2400, Feb. 6, 2017.

Zhang et al. "Plug-and-Play Image Restoration With Deep Denoiser Prior", IEEE Transactions on Pattern Analysis and Machine Intelligence, 44(10): 6360-6376, Published Online Sep. 14, 2022.

Zheng et al. "Deep Plug-and-Play Priors for Spectral Snapshot Compressive Imaging", Photonics Research, 9(2): B18-B29, Published Online Nov. 23, 2020.

Zhou et al. "Deep Denoiser Prior Based Deep Analytic Network for Lensless Image Restoration", Optics Express, 29(17): 27237-27253, Aug. 16, 2021.

(56)     References Cited

OTHER PUBLICATIONS

Zhu et al. "Full Scene Underwater Imaging With Polarization and An Untrained Network", Optics Express, 29(25): 41865-41881, Dec. 6, 2021.

* cited by examiner

FIG. 3A
(a) Polarized
light scene
FIG. 3B
(b) Diffuser
and aperture
FIG. 3C
(c) Polarization
multiplexing filter
and RGB sensor
FIG. 3D
(d) Diffused and
multiplexed
polarization image
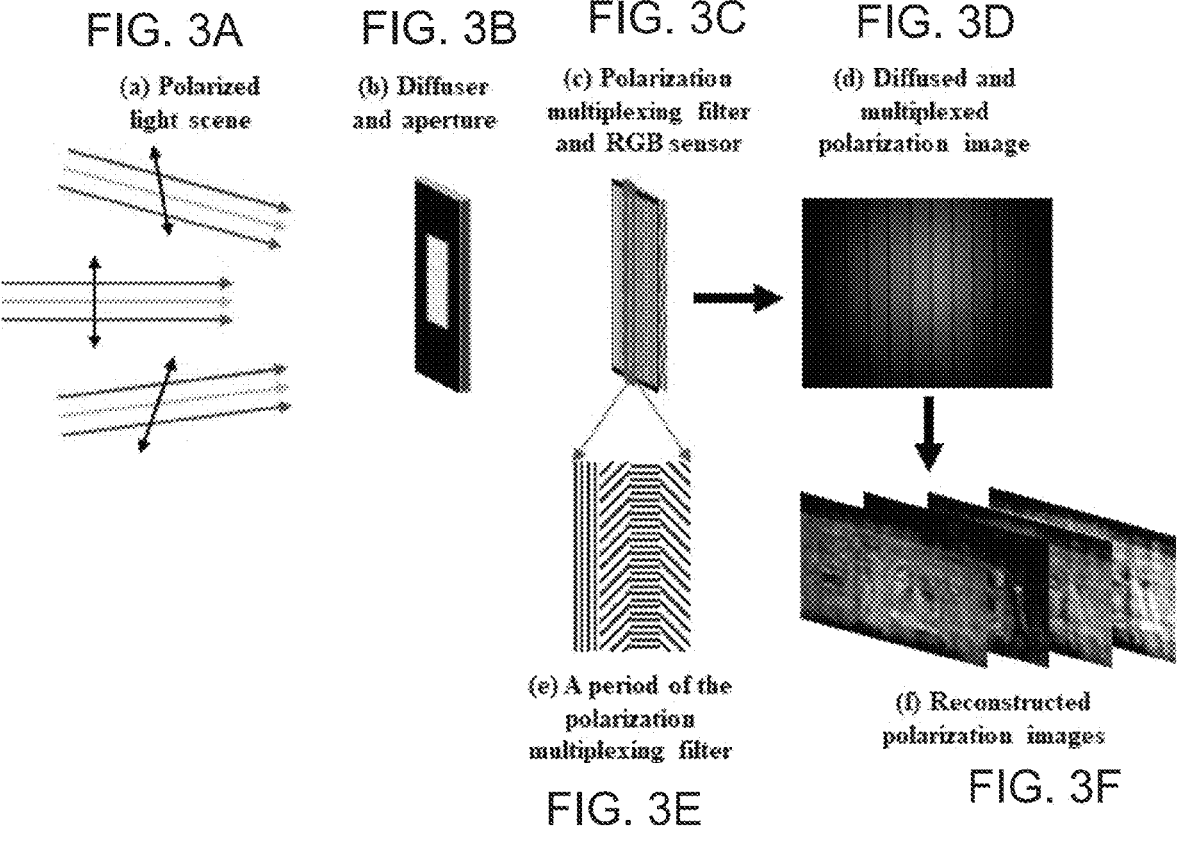
(e) A period of the
polarization
multiplexing filter
FIG. 3E
(f) Reconstructed
polarization images
FIG. 3F
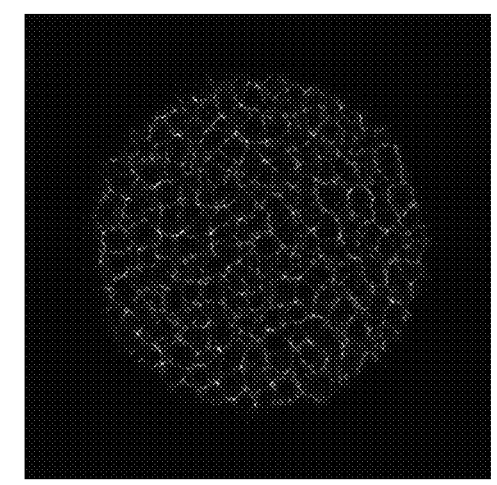
FIG. 4

SYSTEM AND METHOD FOR POLARIZATION IMAGING

RELATED APPLICATION(S)

This application claims the benefit of priority under 35 USC § 119(e) of U.S. Provisional Patent Application No. 63/342,751 filed on May 17, 2022, the contents of which are all incorporated by reference as if fully set forth herein in their entirety.

The project leading to this application has received funding from the European Research Council (ERC) under the European Union's Horizon 2020 Research and Innovation Program (Grant Agreement No. 757497).

FIELD AND BACKGROUND OF THE INVENTION

The present invention, in some embodiments thereof, relates to optics and, more particularly, but not exclusively, to a system and a method for polarization imaging.

Polarization is a basic property of electromagnetic waves, and is defined as the angle and phase between the components of the electric field. The human eye is sensitive to the intensity and the wavelength of an electromagnetic wave in the visible range, but is not sensitive to its polarization. Yet, the polarization encapsulates information, and is therefore used in the field of optics.

Known in the art are polarization cameras that use the polarization of the light in order to reconstruct an image. These cameras can be broadly categorized into two groups. The polarization cameras in one of these group employ polarization filtering in a spatial multiplexed manner, wherein the focal plane is spatially divided into several polarization direction [see, e.g., U.S. Pat. No. 9,293,491]. Such spatial multiplexing is similar in its principles to color mosaiced sensors. The polarization cameras the other group employ polarization filtering in a time-multiplexed manner, wherein the image is reconstructed from a sequence of images, each captured from light that polarized along a different direction [see, e.g., U.S. Pat. No. 8,654,246].

SUMMARY OF THE INVENTION

According to an aspect of some embodiments of the present invention there is provided a system for polarization imaging. The system comprises an optical diffuser characterized by a point spread function (PSF), an image sensor, a spatially multiplexed polarization filter between the optical diffuser and the image sensor, and an image processor having a circuit configured to receive signals from the image sensor and to reconstruct based on the PSF a separate image for each polarization direction formed on the polarization filter.

According to some embodiments of the invention the system wherein the image sensor comprises a plurality of wavelength channels, and wherein the circuit of the image processor is configured to reconstruct each separate image using all wavelength channels.

According to some embodiments of the invention the polarization filter comprises a plurality of spatial periods, each corresponding to a different region over the image sensor, such that a cross-section of portion of a light beam passing through a particular period of the polarization filter covers a respective region over the image sensor.

According to some embodiments of the invention the circuit of the image processor is configured for combining the separate images to a combined image.

According to some embodiments of the invention the optical diffuser comprises a random diffusion pattern.

According to some embodiments of the invention the circuit of the image processor is configured to reconstruct the image based only on signals from a region over the image sensor at which the PSF is shift-invariant.

According to some embodiments of the invention the circuit of the image processor is configured to reconstruct the image based on signals from a region over the image sensor at which the PSF is shift-invariant, and a region over the image sensor at which the PSF is shift-variant.

According to some embodiments of the invention the polarization filter is configured to apply only linear polarization.

According to some embodiments of the invention the polarization filter is configured to apply circular and/or elliptic polarization.

According to some embodiments of the invention the diffuser, the image sensor, and the polarization filter are arranged such that light arrives to the diffuser directly from a scene, then arrives to the arrived to the polarization filter directly from the diffuser, then arrives to the image sensor directly from the polarization filter.

According to some embodiments of the invention the system is a lensless polarization imaging system.

According to an aspect of some embodiments of the present invention there is provided a method of polarization imaging. The method comprises diffusing a light beam arriving from a scene according to a point spread function (PSF) to provide a diffused light beam, applying spatially multiplexed polarization filtering to the diffused light to provide a filtered diffused light beam, generating electrical signals responsively to the filtered diffused light beam, and processing the electrical signals to reconstruct, based on the PSF, a separate image for each polarization direction of the multiplexed polarization filtering.

According to some embodiments of the invention the method comprises generating electrical signals over a plurality of wavelength channels, and wherein the processing comprises reconstruct each separate image using all wavelength channels.

According to some embodiments of the invention the application of spatially multiplexed polarization filtering comprises applying plurality of spatial periods, each corresponding to a different region over an image sensor, such that a cross-section of portion of a light beam passing through a particular period covers a respective region over the image sensor.

According to some embodiments of the invention the method comprises combining the separate images to a combined image.

According to some embodiments of the invention the method employs a random diffusion pattern.

According to some embodiments of the invention the reconstruction is based only on signals from a portion of a cross-section of the beam at which the PSF is shift-invariant.

According to some embodiments of the invention the reconstruction is based on signals from a portion of a cross-section of the beam at which the PSF is shift-invariant, and a portion of a cross-section of the beam at which the PSF is shift-variant.

According to some embodiments of the invention applying the spatially multiplexed polarization filtering comprises applying only linear polarization.

According to some embodiments of the invention the applying the spatially multiplexed polarization filtering comprises applying circular and/or elliptic polarization.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a schematic illustration of a system for polarization imaging, according to some embodiments of the present invention;

Figure 1:
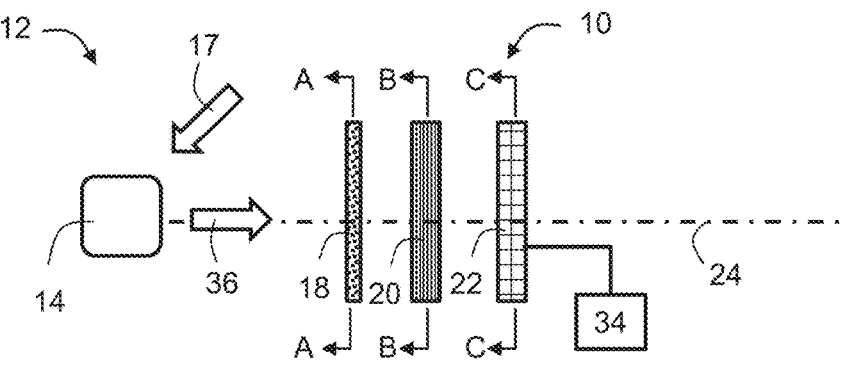
Figures 2A, 2B, 2C:
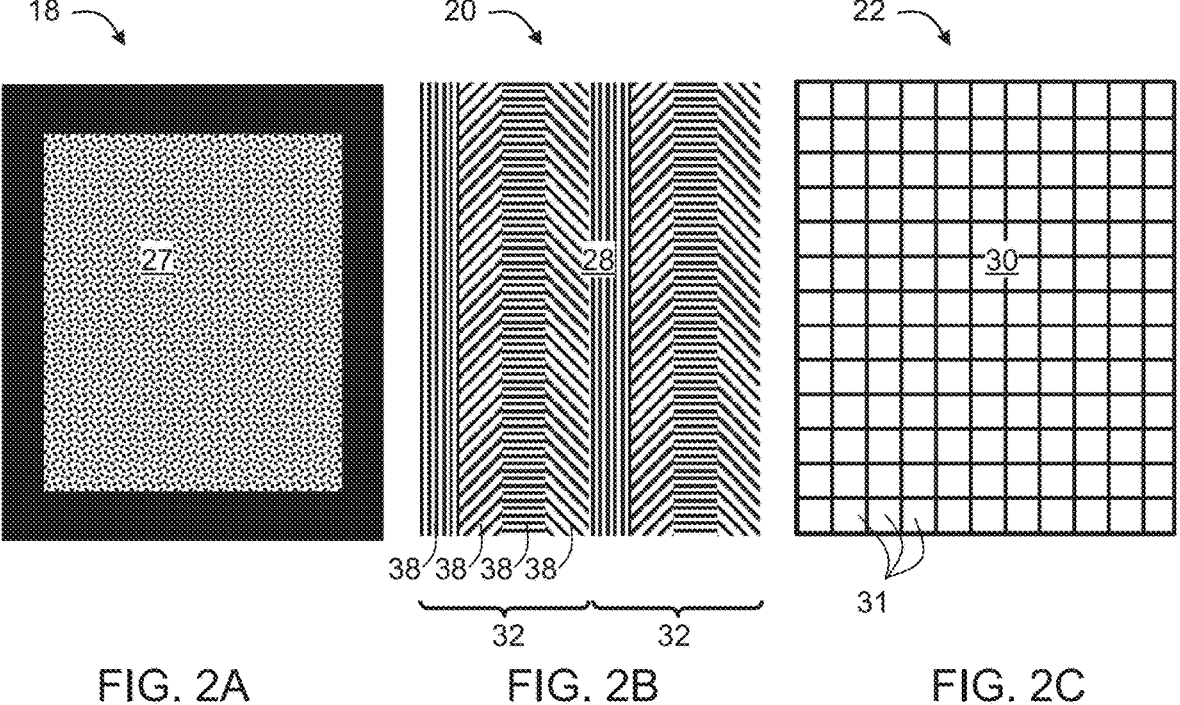
Figures 5, 6A, 6B, 6C, 6D, 6E, 6F, 6G, 6H:
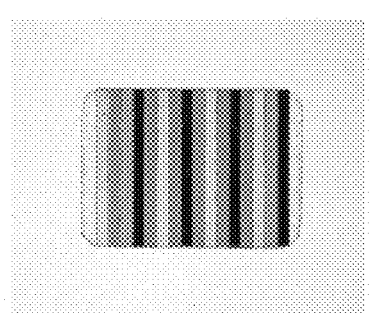

FIGS. 2A-C are schematic cross-sectional illustrations of the system shown in FIG. 1, along the lines A—A, B—B, and C—C, respectively;

FIGS. 3A-F are schematic illustrations showing an overview of a lensless polarization camera used in experiments performed according to some embodiments of the present invention;

FIG. 4 shows an example of a point spread function (PSF) of a diffuser used in experiments performed according to some embodiments of the present invention;

FIG. 5 shows an image captured through a polarization filter used in experiments performed according to some embodiments of the present invention;

FIGS. 6A-H show results of experiments in which the lensless polarization camera was used to image a front-illuminates scene according to some embodiments of the present invention to study the system; and FIGS. 7A-H show results of experiments in which the lensless polarization camera was used to image a back-illuminates scene according to some embodiments of the present invention to study the system.

DESCRIPTION OF SPECIFIC EMBODIMENTS OF THE INVENTION

The present invention, in some embodiments thereof, relates to optics and, more particularly, but not exclusively, to a system and a method for polarization imaging.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1 illustrates a system 10 for polarization imaging, according to some embodiments of the present invention.

System 10 can be used for imaging any scene 12 containing one or more objects 14 that vary the polarization of light 17 interacting therewith and provides a light beam 36 that has a polarization that is different from the polarization of light 17. The light 16 can illuminate scene 12 from its front side or from its back side. Thus, the light beam 36 that is received by system 10 can be reflected off scene 12 or transmitted through scene 12, depending on the application for which system 10 is employed. Representative examples of applications which can benefit from system 10 include, without limitation, material analysis applications, structural analysis applications, astronomy, medical applications, surveillance applications, robotics, and the like.

FIG. 1 illustrates a side view of system 10, parallel to an optical axis 24 thereof. The image plane of system 10 is therefore perpendicular to the plane of FIG. 1. Cross-sectional illustrations along the lines A—A, B—B, and C—C are illustrated in FIGS. 2A, 2B, and 2C, respectively. System 10 comprises an optical diffuser 18, an image sensor 22 having a plurality of sensing elements 31, and a spatially multiplexed polarization filter 20 between optical diffuser 18 and image sensor 22.

In some embodiments of the present invention diffuser 18, image sensor 22, and polarization filter 20 are arranged such that light 36 arrives to diffuser 18 directly from scene 12, then arrives to polarization filter 20 directly from diffuser 18, and then arrives to image sensor 22 directly from polarization filter 20. In some embodiments of the present invention system 10 is a lensless polarization imaging system that is devoid of any lens.

Optical diffuser 18 may comprise a transparent or translucent substrate, such as, but not limited to, glass or transparent polymer, carrying a pattern 27 designed to redirect light passing therethrough. In various exemplary embodiments of the invention the pattern 27 is designed to redirect the light by scattering but may alternatively or additionally be designed to redirect the light by diffraction. The pattern can be etched in the substrate or be attached thereto. The features of pattern 27 may have any suitable shape including, without limitation, pyramids, cones, hemispheres, and the like. The pattern may include features of one or more type, and their size can be uniform or it may vary across the area of the substrate. Typically, the pattern's features are micrometric structures.

As used herein, a "micrometric structure" describes solid structure which has at least one cross-sectional dimension and, in some embodiments, at least two or at least three orthogonal cross-sectional dimensions less than 1 mm, or less than 500 microns, or less than 200 microns, or less than 150 microns, or less than 100 microns, or even less than 70, or less than 50, or less than 20, or less than 10, or less than 5 microns.

In some embodiments of the present invention the pattern of diffuser 18 is a random pattern, but this need not necessarily be the case since in some application it may be desired to introduce order into the pattern, e.g., over a grid. For example, the pattern's features can be arranged in circularly, elliptically, spirally, or linearly. When the features arranged linearly they are preferably arranged linearly along at least two non-parallel directions.

The scattering elements are designed to scatter and homogenize light incident on the diffuser. The pattern 27 of diffuser 18 can be characterize by the point spread function (PSF) which mathematically describes the response of diffuser 18 to a point light source, providing the pattern of the light that is produced when a point source of light is transmitted through diffuser 18. The PSF can have a range of full-width at half-maximum angles from about 1 degree to about 80 degrees.

The spread of the PSF preferably includes at least 15% or at least 20% or at least 25% of the width or the length of image sensor 22. The width of at least a portion of the features of pattern 26, more preferably of each of the features of pattern 26, is preferably less than the aggregate width of N sensing elements (e.g., pixels) of image sensor 22, wherein N is at most 50 or at most 40 or at most 30 or at most 20 or at most 10.

Diffuser 18 can be manufactured using any method known in the art, such as, but not limited to, photolithography, imprint lithography, or the like.

Image sensor 22 receives a light beam and responsively generates an image signal. Sensor 22 is preferably a pixelated sensor (e.g., a MOS imager, a CMOS imager or a CCD) wherein each pixel serves as a sensing element 31 of sensor 22. The sensing elements 31 are preferably arranged grid-wise as an array 30 (e.g., a rectangular array). Image sensor 22 can be a color sensor or a grey scale sensor. When sensor 22 is a color sensor, the image signal is typically, but not necessarily, resolved into at least three wavelength channels. When there are three or more wavelength channels, three wavelengths are optionally and preferably in the visible range, for example, a red channel, a green channel and a blue channel. Also contemplated are embodiments in which at least one of the wavelength channels is in the infrared range, and at least one of the wavelength channels is in the visible range. Also contemplated are embodiments in which at least one of the wavelength channels is in the ultraviolet range, and at least one of the wavelength channels is in the visible range. Also contemplated are embodiments in which at least one of the wavelength channels is in the infrared range, and at least one of the wavelength channels is in the ultraviolet range. Also contemplated are embodiments in which at least one of the wavelength channels is in the infrared range, at least one of the wavelength channels is in the visible range, and at least one of the wavelength channels is in the ultraviolet range. The present embodiments also contemplate a configuration in which the imager provides image signal resolved into four or more wavelength channels. For example, one of the four wavelength channels can be in the infrared range (e.g., near infrared range) and/or ultraviolet range (e.g., UVA, UVB, UVC range)) and each of the remaining three wavelength channels can be in the visible range.

A "visible range", as used herein, refers to a range of wavelengths from about 400 nm to about 700 nm.

An "infrared range", as used herein, refers to a range of wavelengths from about 700 nm to about 1 mm.

A "near infrared range", as used herein, refers to a range of wavelengths from about 700 nm to about 1400 nm.

An "ultraviolet range", as used herein, refers to a range of wavelengths from about 100 nm to about 400 nm.

A "UVA range", as used herein, refers to a range of wavelengths from about 320 nm to about 400 nm.

A "UVB range", as used herein, refers to a range of wavelengths from about 280 nm to about 320 nm.

A "UVC range", as used herein, refers to a range of wavelengths from about 100 nm to about 280 nm.

A representative example of a set of wavelength channels suitable for the present embodiments is a red channel, corresponding to red light (e.g., light having a spectrum having an apex at a wavelength of about 580-680 nm), a green channel, corresponding to green light (spectrum having an apex at a wavelength of from about 500 to about 580 nm), and a blue channel, corresponding to blue light (spectrum having an apex at a wavelength of from about 420 to about 500 nm). Such a set of channels is referred to herein collectively as RGB channels.

Another representative example of a set of wavelength channels suitable for the present embodiments is a red channel, a green channel and a blue channel as detailed above, and also an infrared channel corresponding to near infrared light (spectrum having an apex at a wavelength of from about 800 to about 900 nm).

Spatially multiplexed polarization filter 20 preferably comprises a polarization pattern 28 that applies a position-dependent polarization to light passing therethrough. The applied polarization is "position-dependent" in the sense that at least two different points over the surface of filter 20 polarize the light along a different polarization direction. This is conveniently achieved by providing a polarization pattern 28 that is formed of a plurality of polarization elements each applying a specific polarization to the light passing through the respective polarization element. Preferably, but not necessarily, each of at least a portion of the polarization elements applies linear polarization.

When image sensor 22 comprises a plurality of wavelength channels, the polarization pattern 28 of polarization filter 20 optionally and preferably comprises a plurality of spatial periods 32, each compromising a plurality of segments 38 and corresponding to a different region over of image sensor 22, such that a cross-section of portion of a light beam passing through a particular period 32 covers the respective region over sensor 22. Preferably, the respective region includes pixels or sub-pixels of all wavelength channels, in a manner that there is a plurality of polarization directions to each wavelength channel and a plurality of wavelength channels to each polarization direction. Specifically, suppose that the particular period 32 has a first segment that polarizes light along a first direction, and a second segment that polarizes light along a second direction. Suppose further that the respective region of image sensor 22 comprises a first plurality of pixels for a red channel, a second plurality of pixels for a green channel, and a third plurality of pixels for a blue channel. In this case, for each of the first, second and third plurality of pixels, one portion of the plurality of pixels receives light polarized by the first segment of the period and another portion of the plurality of pixels receives light polarized by the second segment of the period. Generally, for $N_p$ segments of period 32 and $N_c$ wavelength channels, there are $N_p N_w$ such combinations of polarization direction and wavelength channel.

In the representative example shown in FIG. 2B each period includes four segments. The Inventors found that four segments are sufficient to reconstruct an image because they can provide sufficient information allowing to extract all four Stokes parameters. However, any number of periods per segment can be used. For example, filter 20 can include three, four, five, six or more segments per period. Further, FIG. 2B shows an embodiment in which the segments of the period are in the form of stripes, each applying polarization along a different polarization direction, but other shapes and arrangements of the segments are also contemplated. Additionally, while FIG. 2B shows two periods, it is to be understood that any number of periods can be employed. Typically, the number of periods is at least the number of periods along a one of the directions that define the array 30 of sensor 22. For example, when sensor 22 includes N×N pixels, then pattern 28 has at least N periods.

System 10 also comprises an image processor 34 having a circuit configured to receive signals from image sensor 22 and to reconstruct, based on the PSF of optical diffuser 18, a separate image for each polarization direction formed on polarization filter 20. Typically, image processor 34 employs a method that receives the PSF, a model describing the polarization multiplexing of 20, and the image received from sensor 22, and generates an output having a plurality of images each estimating of the image of scene 12, for one of the polarization directions formed on polarization filter 20.

The method employed by image processor 34 employs optionally and preferably integrates the imaging features of the PSF and the structure of the polarization filter into a joint reconstruction of a plurality of polarization sub-images. This can be done in more than one way. In one example a model-based inversion is employed. To reduce noise amplification, image processor 34 optionally and preferably employs a polarization image prior. This is optionally and preferably done by a machine learning procedure that is trained to receive a polarization image prior and to output a denoised image in which the noise of the input image is at least partially removed.

As used herein the term "machine learning" refers to a procedure embodied as a computer program configured to induce patterns, regularities, or rules from previously collected data to develop an appropriate response to future data, or describe the data in some meaningful way.

Representative examples of machine learning procedures suitable for the present embodiments, include, without limitation, clustering, association rule algorithms, feature evaluation algorithms, subset selection algorithms, support vector machines, classification rules, cost-sensitive classifiers, vote algorithms, stacking algorithms, Bayesian networks, decision trees, neural networks (e.g., fully-connected neural network, convolutional neural network), instance-based algorithms, linear modeling algorithms, k-nearest neighbors (KNN) analysis, ensemble learning algorithms, probabilistic models, graphical models, logistic regression methods (including multinomial logistic regression methods), gradient ascent methods, singular value decomposition methods and principle component analysis.

Preferably, the machine learning procedure comprises an artificial neural network.

Artificial neural networks are a class of algorithms based on a concept of inter-connected "neurons." In a typical neural network, neurons contain data values, each of which affects the value of a connected neuron according to connections with pre-defined strengths, and whether the sum of connections to each particular neuron meets a pre-defined threshold. By determining proper connection strengths and threshold values (a process also referred to as training), a neural network can achieve efficient recognition of images and characters. Oftentimes, these neurons are grouped into layers in order to make connections between groups more obvious and to each computation of values. Each layer of the network may have differing numbers of neurons, and these may or may not be related to particular qualities of the input data.

In one implementation, called a fully-connected neural network, each of the neurons in a particular layer is connected to and provides input value to those in the next layer. These input values are then summed and this sum compared to a bias, or threshold. If the value exceeds the threshold for a particular neuron, that neuron then holds a positive value which can be used as input to neurons in the next layer of neurons. This computation continues through the various layers of the neural network, until it reaches a final layer. At this point, the output of the neural network routine can be read from the values in the final layer. Unlike fully-connected neural networks, convolutional neural networks operate by associating an array of values with each neuron, rather than a single value. The transformation of a neuron value for the subsequent layer is generalized from multiplication to convolution. In various exemplary embodiments of the invention the machine learning procedure is a convolutional neural network (CNN).

The machine learning procedure used according to some embodiments of the present invention is a trained machine learning procedure, which provides output that is related non-linearly to the images with which it is fed.

A machine learning procedure can be trained according to some embodiments of the present invention by feeding a machine learning training program with noisy polarization images and respective denoised images from which the noise of the noisy polarization images has been removed. Once the data are fed, the machine learning training program generates a trained machine learning procedure which can then be used without the need to re-train it.

In some embodiments of the present invention image processor 34 recovers an image x from a noisy and degraded image y=Hx+e, where H is a degradation model that provides a degraded image Hx, and e is an additive noise. Preferably, image processor 34 solves an optimization problem formulated using an objective function that comprises a prior term and a fidelity term, which comprises the norm (typically an Euclidean norm) of the distance between the noisy image y and the degraded image Hx. The prior term is optionally and preferably obtained using the aforementioned machine learning procedure.

In some embodiments of the present invention the circuit of image processor 34 reconstructs the image(s) based only on signals from a region over image sensor 22 at which the PSF is shift-invariant. The advantage of these embodiments is that they add simplicity to the reconstruction process, because they allow a linear shift-invariant (LSI) model assumption. Alternatively, the circuit of image processor 34 reconstructs the image(s) based on signals from a region over image sensor at which PSF is shift-invariant, and a region over image sensor at which PSF is shift-variant. The advantage of these embodiments is that they allow utilizing a duality between wide/narrow diffusion in a boarder angular range.

In embodiments in which image sensor 22 comprises a plurality of wavelength channels, the circuit of image processor 34 reconstructs each separate image using all the wavelength channels of image sensor 22 comprises. In some embodiments of the present invention the circuit of image processor 34 combining the separate images to a combined image.

System 10 can be used in many applications. In some embodiments of the present invention system 10 is used for imaging astronomical scenes. For example, system 10 can be used to study magnetic fields, since such fields affect light polarization. By providing polarization images of astronomical objects, such as pulsars or radio galaxies, the presence and strength of magnetic fields can be inferred. In another example, system 10 is used to study the properties of interstellar and intergalactic dust. Since dust particles in space scatter and polarize light in a manner that depends on their size, shape, and composition, such a polarization image of these particles can provide information about their properties.

System 10 can be used to capture polarization images of cables. Over time, cables can become damaged due to wear and tear, corrosion, or external forces, such as vibrations or impacts. Since such damages affect the polarization of light interacting with the cable, polarization imaging can be used to detect and analyze these defects, as well as to study the mechanical and electrical properties of cables. One way to use polarization imaging to analyze cables is by using polarized light microscopy. This involves shining polarized light onto the cable and observing the polarization of the light that is transmitted through the cable. By analyzing the polarization of the transmitted light, it is possible to detect defects, such as cracks, corrosion, or material inhomogeneities, that can affect the cable's mechanical or electrical properties. Another way to use polarization imaging to analyze cables is by using polarimetric sensing. This involves transmitting polarized light through the cable and measuring the polarization of the light that is reflected or transmitted by the cable. By analyzing the polarization of the reflected or transmitted light, changes in the cable's geometry or material properties, as well as to detect defects, such as breaks, kinks, or twists, can be detected.

System 10 can also be used in material analysis, where it is used to detect defects or impurities in materials. For example, in the semiconductor industry, system 10 can be used to detect defects in silicon wafers, which can affect the performance of electronic devices. Polarization images of these wafers provide information regarding the polarization of the light that is transmitted through the wafer, allowing to detect defects and other imperfections.

System 10 can also be used for imaging of biological tissues, for example, for the study of the structure and composition of biological tissues, such as skin, muscles, and tendons. In particular, the polarization imaging of the present embodiments can provide information about the orientation of collagen fibers. System 10 can be employed in an endoscope and provide polarization images of capillary blood vessel and microscopic mucosa patterns on the mucosa surface layer with the difference in their color tone emphasized. Examples of endoscope-related applications that use some polarization images can also include sensing the micro-geometry or surface micro-structure of the organ walls and enhancing the contrast of underwater scattered image in a capsule endoscope, besides such observation into the object's organ mucosa.

System 10 can also be used for non-destructive testing of materials, such as, but not limited to, composites, ceramics, and metals, in order to facilitate detection of defects, stress, and strain. Polarization images captured by system 10 can be used to study the deformation and failure mechanisms of materials under load.

Images captured by system 10 can also be used to detect hidden objects by analyzing the polarization of the reflected light. It can also be used to enhance the contrast of images taken in low-light conditions.

System 10 can also be employed in the field of robotics, for example, to aid in navigation and object recognition, both in indoor and outdoor environments with varying lighting conditions. It can also be used to study the behavior of insects and other animals that use polarization cues for navigation.

System 10 can also be used in the analysis of internal structures. For example, system 10 can be used in polarized light microscopy. In this technique, polarized light is used to illuminate the sample, and a polarizer is used to selectively filter the light that is transmitted through the sample. System 10 images the transmitted light analyzing, and the obtained image is analyzed to obtain information about the orientation, composition, and shape of the internal structures in the sample.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Polarization imaging is a technique that creates a pixelmap of the polarization state in a scene. Although invisible to the human eye (and for most conventional cameras), polarization can assist various sensing and computer vision tasks. Existing polarization cameras acquire the additional modality using either spatial or temporal multiplexing, which increases the camera volume, weight, cost, or altogether. Recent lensless imaging techniques presented a way of image acquisition without a lens in a potentially miniature scale element. By utilizing an optical element that performs a smart coding of the scene on the sensor, a sharp image reconstruction is achieved. This example, describes a lensless polarization camera, composed of a diffuser and a polarization multiplexing filter. By combining it with a reconstruction algorithm that accounts for the compressed imaging properties, good polarization images were obtained.

INTRODUCTION

Polarization is a basic property of light (and electromagnetic waves in general), defined as the angle and phase between the components of the electric field. It encapsulates beneficial information for various sensing and machine vision applications, as mapping the polarization state of a scene can enhance the imaging conditions or measure things that are conventionally invisible. For example, it can be utilized to map and measure mechanical strain in transparent materials, which is invisible in conventional cameras.

Existing polarization cameras are based either on division of focal plane (similar to color mosaiced sensors), or sequential polarization filtering. Polarization-mosaiced sensors [1] enable nice reconstruction results, by utilizing the tremendous effort invested in demosaicing algorithms [2, 3] (originally developed for color imaging). Yet, the Inventors found that they require complex chip-level fabrication. The sequential filtering acquisition approach is based on a conventional image sensor with a polarizer replacement mechanism designed to replace/rotate a polarizer, so the required polarization sub-images can be acquired sequentially. The Inventors found that this scheme limits the allowed dynamics in the scene and/or camera shake (due to registration issues). To avoid this limitation, a rapid polarizer mechanism can be used [4], but the Inventors found that its volume, weight and cost are relatively high.

The Inventors recognized that extreme imaging application like compact microscopy and endoscopy, which may benefit from polarization imaging [5-7], have very strict space and weight requirements, preventing the use of complicated optics, or even the use of a lens [8]. To address this challenge, the Inventors devised a lensless imaging solution.

In the lensless imaging scheme, a hybrid optical-digital acquisition is performed, where an optical element generates a coded image of the scene on the sensor, and a post-processing algorithm reconstructs the sharp image. Such lensless cameras can even acquire additional modality along with the 2D images, such as depth [9-11], time [12] or spectrum [13]. All of these lensless solutions significantly reduce the system size while allowing the acquisition of these modalities FIGS. 3A-F illustrate an overview of the lensless polarization camera of the present example. Assuming a (A) scene with polarized light, the imaging is performed using (B) a random diffuser, and polarization multiplexing is achieved using (C) a polarization multiplexing filter located in the sensor plane. This imaging scheme results in (D) a diffused and multiplexed intermediate image. The diffuser generates a unique PSF with widely spread narrow features (see FIG. 4), allowing image reconstruction from a partially sampled image; this feature allows a simple polarization filter design. Utilizing the diffuser PSF and the polarization filter characteristics (E), the reconstruction algorithm can restore the (F) polarization image of the scene.

The camera of the present example includes (i) a random diffuser (similar to the one used in [9]), whose Point Spread Function (PSF) contains widely spread narrow features, enabling image reconstruction from a partially sampled image; (ii) a polarization filter designed for multiplexing the required polarization states; and (iii) an image processor employing a reconstruction algorithm tailored to the unique features of polarization images.

The camera of the present example has the following properties: (i) compactness; (ii) low-cost; (iii) requiring only a single shot; and (iv) providing good polarization images. The last point is demonstrated herein both in simulation and using a prototype in experiments. Specifically, it is demonstrated that it can be useful for real world applications, specifically, for strain analysis.

Recently, several new polarization cameras were introduced [1, 4, 17], which led to a renewed interest in polarization imaging both in research and applications. The unique properties uncovered using polarization imaging lead to many applications, for example in extreme imaging conditions [18, 19], biological/medical applications [5-7], computer vision tasks [20, 21], remote sensing [22] and even exoplanets discovery in astronomy [23]. This proliferation also led to research on algorithms for polarization image processing, for example demosaicing of a polar-mosaiced sensor (either monochrome or color) [2, 3, 24], and dedicated denoising [25, 26], and deblurring [27] methods for polarization images.

Polarization Imaging

Polarization imaging is defined as the pixelwise mapping of the polarization state in a scene. It can be fully defined using the four Stokes parameters [14]:

$$\begin{cases} S_0 = I \\ S_1 = Ip \cos(2\psi) \cos(2\xi) \\ S_2 = Ip \sin(2\psi) \cos(2\xi) \\ S_3 = Ip \sin(2\xi) \end{cases} \qquad \text{(EQ. 1)}$$

where $S_i$ is the ith Stokes parameter, 1 is the total intensity, p is the degree of polarization and $\psi$, $\xi$ are the angles of the polarization point on the Poincaré sphere [15], indicating the angle and ellipticity of the polarization state. These parameters can be calculated for every point in the scene using several intensity images taken in different polarization states [16] (which will be coined hereafter as polarization sub-images):

$$\begin{cases} S_0 = I_0 + I_{90} \\ S_1 = I_0 - I_{90} \\ S_2 = I_{45} - I_{135} \\ S_3 = I_{RCP} - I_{LCP} \end{cases} \qquad \text{(EQ. 2)}$$

where $I_\theta$ is the sub-image in linear polarization at angle $\theta°$ or in right/left circular polarization (RCP/LCP).

Lensless Imaging

Several lensless imaging methods were recently introduced [9-11, 28-31]. Such cameras are based on a conventional image sensor and a mask that replaces the lens in the sense that it has some sort of a PSF. Such PSF is generally very poor and its imaging capability is far from any conventional lens performance. However, such mask has unique properties that enable a post-capture reconstruction of the image, achieving nice lensless imaging performance. The mask can modulate either amplitude [10] or phase [9, 11, 31], be designed [10, 11] or random [9], and in some cases even a bare sensor [30] or fiber bundle [28, 29] can suffice. In addition to conventional 2D imaging, such lensless cameras can capture additional modalities, e.g. depth [9-11], time [12] or spectrum [13]. In this example, the unique features of lensless imaging are efficiently utilized together with the properties of polarization images to design a simple lensless polarization camera.

Plug-and-Play Image Restoration

Non-blind image reconstruction is based on model-based inversion and prior compliance. While the first is generally theoretically reasoned and rigorous, the Inventors found that it suffers from several inherent issues, where the most prominent are noise sensitivity and model inaccuracies. These limitations result in poor reconstruction performance in almost all real-world applications. To address these issues, model-based inversion is balanced with prior compliance, which is designed to regularize the data-term, and generate an output image with similar appearance of the image domain (which can be monochrome, color, infrared, multi/hyper-spectral, polarization etc.). While the model-prior balance generates an inherent trade-off [32], the prior term itself, and its integration in the reconstruction process is an active area of research for decades [33-36].

Recently, end-to-end trained deep-learning (DL) based methods were suggested as a solution for inverse problems [37]. Such method encapsulate both the model and the prior, without any clear separation between them. This approach generally leads to improved results, but depends on very large training sets, and require dedicated training of the DL-model for every degradation model. These issues can be addressed using un/self-supervised learning [38, 39].

Another approach, coined Plug-and-Play (PnP) priors for image restoration [40], which has many recently proposed variants [41-44], attempts to take the best of both worlds, i.e. the accuracy, flexibility and explainability of model-based reconstruction, along with a standalone (preferably learnable) denoiser prior. These methods use a denoising operation as a prior term. Intuitively, the denoising operation can be considered also as a projection operator to the manifold of desired images. By iteratively performing model-based inversion and then denoising, improved reconstruction results can be achieved. The method features a very attractive flexibility vs. performance trade-off, as both the denoiser (either learnable or not) and the degradation model can be easily replaced, and simple parameter tuning can balance the data/prior trade-off.

System Design

The lensless polarization camera design of this example is based on a combination of a random diffuser with a polarization multiplexing filter. These two components encode the polarization information in the image plane. The diffuser replaces the lens thanks to its unique PSF that performs a spatial encoding of the scene, which enables its reconstruction even from a partially sampled image. This unique spatial coding allows using a simple polarization filter to multiplex the different polarization states, thus allowing to restore the polarization sub-images which are required to perform the polarization mapping of the scene. To reconstruct the polarization sub-images, a dedicated PnP-based algorithm that relies on the resulted encoding and the statistics of polarization images is employed.

Diffuser Based Imaging

FIG. 4 shows an example diffuser PSF. The random pattern of the diffuser acts as multiple randomly distributed lens-like features. This provides a widely spread PSF with many narrow features, which enables image reconstruction.

Due to its random structure, the diffuser's PSF has both very wide spatial response, containing a lot of narrow caustic-like features (see FIGS. 2A-C). Each narrow feature in the PSF can be considered as the response of a micro-lens (as it maps a point-source to a point in the image), and therefore the full intermediate image formed by the diffuser can be thought of as numerous shifted replicas of the object, spread on almost the entire sensor due to the wide extent of the PSF.

This uncommon wide/narrow duality of the diffuser PSF enables a unique lensless imaging scheme: as the intermediate image contains multiple shifted replicas of the scene, even partial sampling of the image plane can contain enough information for image reconstruction. This principle is utilized for the compression and restoration of an additional modality along with the 2D images. A time/spectrum reconstruction [12, 13] is used for polarization reconstruction. To simplify the reconstruction process, the imaging system was limited to the domain where the PSF is shift-invariant, thus enabling a linear shift-invariant (LSI) model assumption. However, One may use a shift-variant PSF of the diffuser, as it features the wide/narrow duality in a very wide angle. Thus, the solution in this example can be adapted also with a linear shift-variant model.

Polarization Multiplexing Filter

The unique wide/narrow duality of the diffuser PSF enables image reconstruction even from a partially sampled image. Therefore, spatial multiplexing in the image plane can be used to compress an additional modality along with the spatial information. This compression ability had been presented for video from single image using the spatial rolling shutter sampling pattern [12] and for multi-spectral reconstruction using a mosaiced spectral filter [13]. In this work, the same principle is used for multiplexing polarization sub-images.

While polarization is a property of the electro-magnetic wave amplitude, conventional image sensors sense only the intensity, and they are insensitive to the polarization. Therefore, to enable polarization imaging, polarization optical elements are used so as to generate polarization sensitivity, and several intensity images are captured so as to solve the amplitude-to-intensity ambiguities. Full reconstruction of the Stokes parameters for each pixel requires six polarization sub-images, as presented in EQ. (2). Yet, linear-only polarization mapping can be achieved using only four sub-images. In this example, the reconstruction is only for the case of linear polarization mapping, but similar approach can be used for circular or elliptical polarization.

For linear polarization mapping, four polarization sub-images are required: $I_\theta$, where $\theta=0°$, $45°$, $90°$, $135°$ (note that while linear polarization mapping is also possible using three sub-images, this example follows the common practice and uses four, to improve stability [1, 4, 17]).

To avoid complex pixel-level fabrication, and by leveraging the partial sampling ability of the diffuser-based imaging scheme, a very simple striped structure polarization multiplexing filter is used, with a periodic pattern of linear polarizer stripes in the required angles. FIG. 5 is an image captured through a filter composed of several polarizer stripes in the required angles. Captured under polarized illumination, the different transmission can be clearly seen.

The structure of the filter allows partial sampling in each of the required polarization angles. The main trade-off in such a filter design is the individual stripe width, where a smaller stripe performs a denser sampling, with the cost of a more complex fabrication. As very dense sampling is not critical, relatively wide stripes, which are easy to fabricate, can be used, as detailed below.

Reconstruction Algorithm

In this example, the reconstruction algorithm integrates the diffuser PSF imaging features and the polarization multiplexing filter structure to a joint reconstruction of the four polarization sub-images. While model-based inversion (utilizing the known LSI diffuser PSF and the polarization filter structure) can lead to some reconstruction ability, such an approach suffer from very high noise sensitivity, resulting in noise amplification and performance degradation. To overcome this, some signal prior is be used.

As shown in FIGS. 6A-H and 7A-H below, polarization images have unique properties, which are not easily derived from natural image priors. Some edges are consistent to all sub-images, while others depend on the materials and lighting properties. Moreover, the material and lighting related edges/textures have inter sub-image correlations, related to the polarization properties of the material.

In order to implicitly grasp the complex structure of polarization images and use it as a regularizing prior, the concept of PnP is employed. A deep CNN for polarization image denoising is trained, and its denoising operation is integrated in the reconstruction process as a polarization image prior.

The method is based on the framework for recovering a signal x from a degraded and noisy measurement y=Hx+e, where H is the degradation model and e is the additive noise:

$$f(\tilde{x}) = \frac{1}{2\sigma_e^2} \|y - H\tilde{x}\|_2^2 + s(\tilde{x}). \qquad \text{(EQ. 3)}$$

The problem is formulated as a cost function f(x), where x̃ is the optimization variable, and the symbol $\|\cdot\|_2$ stands for the Euclidean norm. The first term in EQ. 3 is the fidelity term that validates model consistency. The second is the prior term that regularizes the optimization process using the image model s(x). The minimization of the cost function converges to the desired solution. As solving f(x) directly is not simple, it can be split to several terms and alternately optimized using either the ADMM [49] or FISTA [50] methods. The PnP method [40] suggest to replace the prior-related step with a gaussian denoiser. Using this approach, the degradation model and the denoiser prior can be easily replaced, allowing high flexibility and explainability. The full process, based on FISTA steps with a polarization image denoising CNN, is presented in Procedure 1, below.

| Procedure 1 |
| --- |
| Input: Diffuser PSF and polarization filter multiplexing model H; diffused and multiplexed image y, polarization image denoising CNN $\mathcal{D}(\cdot; \sigma)$; stopping criterion. |

Output: x̂ an estimate for x.
Initialize: $x_0$, $v_0$ = some initialization; $t_0 = 1$, $k = 0$; some initialization for $\sigma_k$ and λ.
while stopping criterion not met do
   |  k = k + 1;

|  $x_k = v_{k-1} - \dfrac{1}{\lambda} H^T (H v_{k-1} - y)$;

|  $x_k = \mathcal{D}(x_k ; \sigma_k)$;
   |  $t_k = 1 + \sqrt{1 + 4t_{k-1}^2}/2$;

|  $v_k = x_k + \dfrac{t_{k-1} - 1}{t_k}(x_k - x_{k-1})$;

end
x̂ = $x_k$;

The initialization of $x_0$, $v_0$ can be set to zero. However, for improved convergence, one can initialize with simple restoration based on interpolation (to fill the polarization filter gaps) and Wiener filtering. The noise standard-deviation $\sigma_k$ can be set to converge from an initial value, or be estimated in every iteration using the residual error:

$$e_k = |Hv_{k-1} - y|_2.$$

The stopping criterion that was tested is $e_k < e_{desired}$ or $N_{iter} < N_{max}$, where $e_{desired}$ was set according to the tolerable noise level in the current scene, and $N_{max}$ was set following the maximal time the procedure was allowed to converge.

The polarization image denoising CNN, which is used as a prior in the reconstruction process, is based on the denoiser architecture presented in [44] that achieve state of the art performance for color image denoising. The architecture is adapted to polarization images and trained using the polarization image datasets from KAUST [3] and TokyoTech [24]. A total of 4480 patches of 128×128 pixels are used, in a 80/20 training/validation split. As the architecture was designed to get the noise standard deviation as an input, the image patches were noised during training with additive white Gaussian noise with $\sigma \sim U(1, 50)$ (on a [0-255] scale). The CNN is trained using the smooth L1 loss and ADAM optimizer for 300 epochs. The CNN achieves nearly perfect denoising performance of δ<5, and gradually degrades to PSNR=33, SSIM=0.93 for σ=50.

Experimental Results

To experimentally validate the proposed design, a lensless polarization camera prototype was built. Its components and assembly process are detailed, and its performance on real world polarized scenes is analyzed. Following the performance analysis, a discussion on the approach limitations is brought.

Prototype Structure

The prototype lensless polarization camera was based on a 0.5° diffuser (Edmund Optics #35-860) mounted on a 12.3MP, 3.45 μm pixel pitch CMOS camera (Thorlabs CS126CU). The polarization filter is fabricated using a linear film polarizer (Thorlabs LPVISE2X2) cut to stripes of approximately 880 μm (equivalent to about 256 pix) oriented in the required polarization angles. The stripes were then assembled in the required form, and the filter is incorporated in front of the sensor. The diffuser PSF was measured by taking an image of a point source (FIG. 4) without the polarization filter. The polarization filter response was measured using the bare image sensor and a polarized light source rotated in the required polarization angles. The measured PSF and polarization filter response were incorporated in the reconstruction procedure as the degradation and polarization multiplexing models.

Table-Top Experiments

To demonstrate and analyze the capabilities of the proposed camera, two types of polarized light scenes were created: (i) front-illuminated scene with two orthogonally polarized projectors, to demonstrate the ability to separate between two sources of light, and (ii) back-illuminated scene with a polarized screen, with a transparent material on it, to analyze the ability to perform strain analysis. In both cases, the performance are compared to a conventional lens camera, performing polarization imaging using sequential acquisition.

In the case of front-illuminates scene (FIGS. 6A-H), the scene was illuminated with a linear polarized light at $\theta=0°$ from the left, and a similar light at $\theta=90°$ from the right. In such case, $I_0$, $I_{90}$ look like they are lit from opposite directions, while 145, 1135 are evenly illuminated. FIGS. 6A-H show a front illumination example. FIG. 6A-D show lensless imaging results and FIGS. 6E-H show reference lens-based camera for different polarization sub-images: $I_{135}$ (FIGS. 6A and 6E), 190 (FIGS. 6B and 6F), 145 (FIGS. 6C and 6G), $I_0$ (FIGS. 6D and 6H).

As shown in FIGS. 6A-H, the overall structure of the scene is well reconstructed, with typical artifacts to lensless images. The even illumination for $I_{45}$, $I_{135}$ is well reconstructed, and the uneven illumination in $I_0$, $I_{90}$ is also visible although not as prominent as in the reference lens-based images.

Figures 7A, 7B, 7C, 7D, 7E, 7F, 7G, 7H:
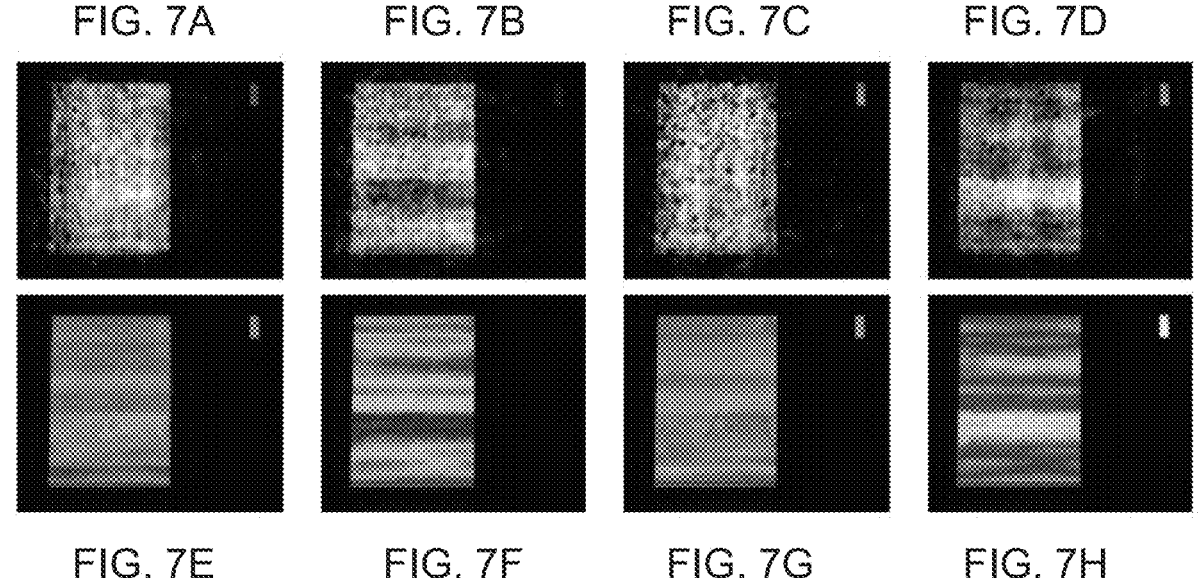

Another common application of polarization imaging is strain analysis in transparent materials. Non-contact strain analysis is a challenge, which can be efficiently addressed with polarization imaging due to the fact that strain causes birefringence, which changes the polarization state of the light. Since birefringence is also highly wavelength dependent (in most cases), color-polarization imaging can be used for mapping it, and as a byproduct the strain can be analyzed. Back illumination example is presented in FIGS. 7A-H, where a plastic bag is located on a white linear polarized screen ($\theta=135°$). FIG. 7A-D shows lensless imaging results and FIGS. 7E-H shows reference lens-based camera for different polarization sub-images: $I_{135}$ (FIGS. 7A and 7E), 190 (FIGS. 7B and 7F), 145 (FIGS. 7C and 7G), $I_0$ (FIGS. 7D and 7H). As shown, most of the effect takes place in 145, 1135, and its overall structure and color (indicating the strain direction and level) are well reconstructed. In $I_0$, $I_{90}$ the birefringence is less prominent, and the overall structure is reconstructed with lensless imaging artifacts. Note that the reference background illumination point (top-right in each sub-image) is reconstructed according to the polarization direction.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

REFERENCES

[1] Sony, "Polarsens," https://www(dot)sony-semicon(dot) co(dot)jp/e/products/IS/industry/technology/polarization (dot)html (2021). Accessed: 2021-12-24.

[2] J. Zhang, J. Shao, H. Luo, X. Zhang, B. Hui, Z. Chang, and R. Liang, "Learning a convolutional demosaicing network for microgrid polarimeter imagery," Opt. Lett. 43, 4534-4537 (2018).

[3] S. Qiu, Q. Fu, C. Wang, and W. Heidrich, "Polarization Demosaicking for Monochrome and Color Polarization Focal Plane Arrays," in Vision, Modeling and Visualization, H.-J. Schulz, M. Teschner, and M. Wimmer, eds. (The Eurographics Association, 2019).

[4] N. Lefaudeux, N. Lechocinski, S. Breugnot, and P. Clemenceau, "Compact and robust linear Stokes polarization camera," in Polarization: Measurement, Analysis, and Remote Sensing VIII, vol. 6972 D. B. Chenault and D. H. Goldstein, eds., International Society for Optics and Photonics (SPIE, 2008), pp. 76-87.

[5] M. Shribak, "Polychromatic polarization microscope: bringing colors to a colorless world," Sci. reports 5, 17340 (2015).

[6] J. C. Ramella-Roman, I. Saytashev, and M. Piccini, "A review of polarization-based imaging technologies for clinical and preclinical applications," J. Opt. 22, 123001 (2020).

[7] C. Rodríguez, A. V. Eeckhout, L. Ferrer, E. Garcia-Caurel, E. González-Arnay, J. Campos, and A. Lizana, "Polarimetric data-based model for tissue recognition," Biomed. Opt. Express 12, 4852-4872 (2021).

[8] K. Yanny, N. Antipa, W. Liberti, S. Dehaeck, K. Monakhova, F. L. Liu, K. Shen, R. Ng, and L. Waller, "Miniscope3d: optimized single-shot miniature 3d fluorescence microscopy," Light. Sci. & Appl. 9 (2020).

[9] N. Antipa, G. Kuo, R. Heckel, B. Mildenhall, E. Bostan, R. Ng, and L. Waller, "Diffusercam: lensless single-exposure 3d imaging," Optica 5, 1-9 (2018).

[10] M. S. Asif, A. Ayremlou, A. Sankaranarayanan, A. Veeraraghavan, and R. G. Baraniuk, "Flatcam: Thin, lensless cameras using coded aperture and computation," IEEE Transactions on Comput. Imaging 3, 384-397 (2017).

[11] V. Boominathan, J. Adams, J. Robinson, and A. Veeraraghavan, "Phlatcam: Designed phase-mask based thin lensless camera," IEEE Transactions on Pattern Analysis Mach. Intell. pp. 1-1 (2020).

[12] N. Antipa, P. Oare, E. Bostan, R. Ng, and L. Waller, "Video from stills: Lensless imaging with rolling shutter," in 2019 EEE International Conference on Computational Photography (ICCP), (2019), pp. 1-8.

[13] K. Monakhova, K. Yanny, N. Aggarwal, and L. Waller, "Spectral diffusercam: lensless snapshot hyperspectral imaging with a spectral filter array," Optica 7, 1298-1307 (2020).

[14] F. Perrin, "Polarization of light scattered by isotropic opalescent media," The J. Chem. Phys. 10,415-427 (1942).

[15] H. Poincaré, "Théorie mathématique de la lumière, vol. 2 (georges carré, paris)," MI MISHCHENKO AND LD TRAVIS 44 (1892).

[16] J. E. Solomon, "Polarization imaging," Appl. Opt. 20,1537-1544 (1981).

[17] N. A. Rubin, G. D'Aversa, P. Chevalier, Z. Shi, W. T. Chen, and F. Capasso, "Matrix fourier optics enables a compact full-stokes polarization camera," Science 365, eaax1839 (2019).

[18] Y. Zhu, T. Zeng, K. Liu, Z. Ren, and E. Y. Lam, "Full scene underwater imaging with polarization and an untrained network," Opt. Express 29, 41865-41881 (2021).

[19] J. Fade, S. Panigrahi, A. Carré, L. Frein, C. Hamel, F. Bretenaker, H. Ramachandran, and M. Alouini, "Long-range polarimetric imaging through fog," Appl. Opt. 53,3854-3865 (2014).

[20] V. Deschaintre, Y. Lin, and A. Ghosh, "Deep polarization imaging for 3d shape and svbrdf acquisition," in Proceedings of the IEEE/CVF Conference on Computer Vision and Pattern Recognition (CVPR), (2021).

[21] Y. Ba, A. Gilbert, F. Wang, J. Yang, R. Chen, Y. Wang, L. Yan, B. Shi, and A. Kadambi, "Deep shape from polarization," in Computer Vision—ECCV 2020, A. Vedaldi, H. Bischof, T. Brox, and J.-M. Frahm, eds. (Springer International Publishing, Cham, 2020), pp. 554-571.

[22] J. S. Tyo, D. H. Goldstein, D. B. Chenault, and J. A. Shaw, "Polarization in remote sensing—introduction," Appl. Opt. 45,5451-5452 (2006).

[23] H. M. Schmid, D. Gisler, F. Joos, H. P. Povel, J. O. Stenflo, M. Feldt, R. Lenzen, W. Brandner, J. Tinbergen, A. Quirrenbach, R. Stuik, R. Gratton, M. Turatto, and R. Neuhäuser, "ZIMPOL/CHEOPS: a Polarimetric Imager for the Direct Detection of Extra-solar Planets," in Astronomical Polarimetry: Current Status and Future Directions, vol. 343 of Astronomical Society of the Pacific Conference Series A. Adamson, C. Aspin, C. Davis, and T. Fujiyoshi, eds. (2005), p. 89.

[24] M. Morimatsu, Y. Monno, M. Tanaka, and M. Okutomi, "Monochrome and color polarization demosaicking using edge-aware residual interpolation," 2020 IEEE Int. Conf. on Image Process. (ICIP) pp. 2571-2575 (2020).

[25] J. Zhang, H. Luo, R. Liang, W. Zhou, B. Hui, and Z. Chang, "Pca-based denoising method for division of focal plane polarimeters," Opt. Express 25, 2391-2400 (2017).

[26] X. Li, H. Li, Y. Lin, J. Guo, J. Yang, H. Yue, K. Li, C. Li, Z. Cheng, H. Hu, and T. Liu, "Learning-based denoising for polarimetric images," Opt. Express 28, 16309-16321 (2020).

[27] A. Tang, "A restoration of underwater polarized images based on dcp," in 2019 International Conference on Sensing, Diagnostics, Prognostics, and Control (SDPC), (2019), pp. 675-678.

[28] A. Porat, E. R. Andresen, H. Rigneault, D. Oron, S. Gigan, and O. Katz, "Widefield lensless imaging through a fiber bundle via speckle correlations," Opt. Express 24, 16835-16855 (2016).

[29] U. Weiss and O. Katz, "Two-photon lensless micro-endoscopy with in-situ wavefront correction," Opt. Express 26, 28808-28817 (2018).

[30] G. Kim, K. Isaacson, R. Palmer, and R. Menon, "Lensless photography with only an image sensor," Appl. Opt. 56, 6450-6456 (2017).

[31] A. Sinha, J. Lee, S. Li, and G. Barbastathis, "Lensless computational imaging through deep learning," Optica 4, 1117-1125 (2017).

[32] Y. Blau and T. Michaeli, "The perception-distortion tradeoff," in The IEEE Conference on Computer Vision and Pattern Recognition (CVPR), (2018).

[33] A. N. Tikhonov and V. Y. Arsenin, Solutions of ill-posed problems (V. H. Winston & Sons, Washington, D.C.: John Wiley & Sons, New York, 1977).

[34] L. I. Rudin, S. Osher, and E. Fatemi, "Nonlinear total variation based noise removal algorithms," Phys. D: Nonlinear Phenom. 60, 259-268 (1992).

[35] S. Mallat, A Wavelet Tour of Signal Processing, Third Edition: The Sparse Way (Academic Press, Inc., USA, 2008), 3rd ed.

[36] M. Elad, Sparse and Redundant Representations: From Theory to Applications in Signal and Image Processing (Springer Publishing Company, Incorporated, 2010).

[37] G. Ongie, A. Jalal, C. A. Metzler, R. G. Baraniuk, A. G. Dimakis, and R. Willett, "Deep learning techniques for inverse problems in imaging," (2020).

[38] D. Ulyanov, A. Vedaldi, and V. Lempitsky, "Deep image prior," in Proceedings of the IEEE Conference on Computer Vision and Pattern Recognition (CVPR), (2018).

[39] K. Monakhova, V. Tran, G. Kuo, and L. Waller, "Untrained networks for compressive lensless photography," Opt. Express 29,20913-20929 (2021).

[40] S. V. Venkatakrishnan, C. A. Bouman, and B. Wohlberg, "Plug-and-play priors for model based reconstruction," in IEEE Global Conference on Signal and Information Processing, (2013), pp. 945-948.

[41] Y. Romano, M. Elad, and P. Milanfar, "The little engine that could: Regularization by denoising (red)," SIAM J. on Imaging Sci. 10 (2016).

[42] K. Zhang, W. Zuo, S. Gu, and L. Zhang, "Learning deep cnn denoiser prior for image restoration," in IEEE Conference on Computer Vision and Pattern Recognition, (2017), pp. 3929-3938.

[43] T. Tirer and R. Giryes, "Image restoration by iterative denoising and backward projections," IEEE Transactions on Image Process. 28,1220-1234 (2019).

[44] K. Zhang, Y. Li, W. Zuo, L. Zhang, L. Van Gool, and R. Timofte, "Plug-and-play image restoration with deep denoiser prior," IEEE Transactions on Pattern Analysis Mach. Intell. (2021).

[45] H. Zhou, H. Feng, W. Xu, Z. Xu, Q. Li, and Y. Chen, "Deep denoiser prior based deep analytic network for lensless image restoration," Opt. Express 29,27237-27253 (2021).

[46] S. Zheng, Y. Liu, Z. Meng, M. Qiao, Z. Tong, X. Yang, S. Han, and X. Yuan, "Deep plug-and-play priors for spectral snapshot compressive imaging," Photon. Res. 9, B18—B29 (2021).

[47] H. Qiu, Y. Wang, and D. Meng, "Effective snapshot compressive-spectral imaging via deep denoising and total variation priors," in Proceedings of the IEEE/CVF Conference on Computer Vision and Pattern Recognition (CVPR), (2021), pp. 9127-9136.

[48] X. Yuan, Y. Liu, J. Suo, F. Durand, and Q. Dai, "Plug-and-play algorithms for video snapshot compressive imaging," IEEE Transactions on Pattern Analysis Mach. Intell. pp. 1-1 (2021).

[49] S. Boyd, N. Parikh, E. Chu, B. Peleato, and J. Eckstein, "Distributed optimization and statistical learning via the alternating direction method of multipliers," Found. Trends Mach. Learn. 3,1-122 (2011).

[50] A. Beck and M. Teboulle, "A fast iterative shrinkage-thresholding algorithm with application to wavelet-based image deblurring," in 2009 IEEE International Conference on Acoustics, Speech and Signal Processing, (2009), pp. 693-696.

What is claimed is:

1. A system for polarization imaging, comprising an optical diffuser characterized by a point spread function (PSF), an image sensor, a spatially multiplexed polarization filter between said optical diffuser and said image sensor, and an image processor having a circuit configured to receive signals from said image sensor and to reconstruct based on said PSF a separate image for each polarization direction formed on said polarization filter;
   wherein said image sensor comprises a plurality of wavelength channels, and wherein said circuit of said image processor is configured to reconstruct each separate image using all wavelength channels.

2. The system of claim 1, wherein said polarization filter comprises a plurality of spatial periods, each corresponding to a different region over said image sensor, such that a cross-section of portion of a light beam passing through a particular period of said polarization filter covers a respective region over said image sensor.

3. The system of claim 1, wherein said circuit of said image processor is configured for combining said separate images to a combined image.

4. The system of claim 1, wherein said optical diffuser comprises a random diffusion pattern.

5. The system of claim 1, wherein said circuit of said image processor is configured to reconstruct said image based only on signals from a region over said image sensor at which said PSF is shift-invariant.

6. The system of claim 1, wherein said circuit of said image processor is configured to reconstruct said image based on signals from a region over said image sensor at which said PSF is shift-invariant, and a region over said image sensor at which said PSF is shift-variant.

7. The system of claim 1, wherein said polarization filter is configured to apply only linear polarization.

8. The system of claim 1, wherein said polarization filter is configured to apply circular and/or elliptic polarization.

9. The system of claim 1, wherein said diffuser, said image sensor, and said polarization filter are arranged such that light arrives to said diffuser directly from a scene, then arrives to said polarization filter directly from said diffuser, then arrives to said image sensor directly from said polarization filter.

10. The system of claim 1, being a lensless polarization imaging system.

11. The system according to claim 1, wherein said optical diffuser comprises a diffusion pattern having a plurality of pattern features, and wherein a width of at least a portion of said pattern features is less than an aggregate width of at most 20 sensing elements of said image sensor.

12. A method of polarization imaging, comprising,
   by an optical diffuser, diffusing a light beam arriving from a scene according to a point spread function (PSF) to provide a diffused light beam,
   by a spatially multiplexed polarization filter, applying spatially multiplexed polarization filtering to said diffused light beam to provide a filtered diffused light beam,
   by an image sensor, generating electrical signals responsively to said filtered diffused light beam, wherein said polarization filter is between said diffuser and said image sensor, and
   by an image processor having a circuit, processing said electrical signals to reconstruct, based on said PSF, a separate image for each polarization direction of said multiplexed polarization filtering;
   wherein said image sensor comprises a plurality of wavelength channels, wherein said generating electrical signals comprises generating electrical signals over said plurality of wavelength channels, and wherein said processing comprises reconstructing each separate image using all wavelength channels.

13. The method of claim 12, wherein said applying said spatially multiplexed polarization filtering comprises applying a plurality of spatial periods, each filtering a different wavelength channel.

14. The method of claim 12, comprising combining said separate images to a combined image.

15. The method of claim 12, wherein said diffusing is according to a random diffusion pattern.

16. The method of claim 12, wherein said reconstructing is based only on signals from a portion of a cross-section of said beam at which said PSF is shift-invariant.

17. The method of claim 12, wherein said reconstructing is based on signals from a portion of a cross-section of said beam at which said PSF is shift-invariant, and a portion of a cross-section of said beam at which said PSF is shift-variant.

18. The method of claim 12, wherein said applying said spatially multiplexed polarization filtering comprises applying only linear polarization.

19. The method of claim 12, wherein said applying said spatially multiplexed polarization filtering comprises applying circular and/or elliptic polarization.

* * * * *